Jan. 22, 1963   J. G. LIVINGSTONE   3,074,581
POURING ADAPTOR
Filed Aug. 8, 1958
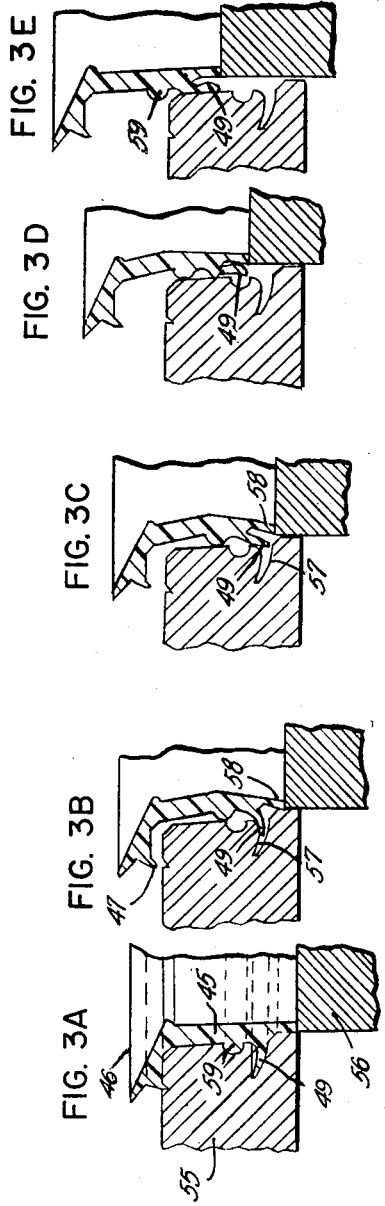
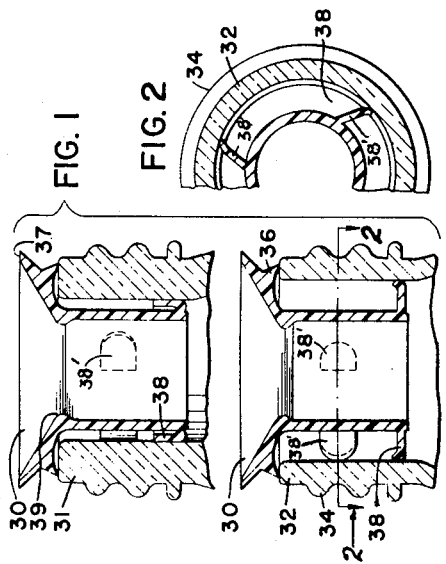

United States Patent Office 3,074,581
Patented Jan. 22, 1963

3,074,581
POURING ADAPTOR
Jay Gould Livingstone, 715 W. Market St., Akron, Ohio
Filed Aug. 8, 1958, Ser. No. 753,949
3 Claims. (Cl. 215—73)

This invention relates to an adapter designed to fit in the neck of a bottle or other container, and to the method of producing such an adapter.

The application is a continuation in part of my application Serial No. 494,985 filed March 17, 1955, now 2,848,145.

Generally, in the manufacture of bottles, bottle manufacturers control only the outside diameter of the neck of the bottle, and this is particularly true of bottles which are designed to have caps threaded on to them. As a result the inside diameter of these bottles varies over a considerable range. The adapters of this invention are provided with flanges or the like so that they make a tight fit in bottle necks of different inside diameters.

In order to fit tight in the top of a bottle, flexible projections are formed which extend outwardly from the outer wall of the adapter and make contact with the inner wall of the bottle neck whereby the adapter is held in the bottle neck. These projections may be of any desired size and shape. They may be rod-like, or annular, or flat, or of any other cross section. Generally they will all extend about the same distance from the outer wall of the adapter, but this is not essential. It is advantageous to include at the bottom of the adapter an outwardly extending annular flange which seals off the bottom of the space between the outer wall of the adapter and the inner wall of the neck. Although preferably located at the bottom, such a flange may be located somewhat above the bottom of the adapter.

Difficulty was experienced in molding an adapter with this outwardly extending flange. When the adapter was ejected from the mold the tendency was for the flange to be bent downwardly and not resume an outwardly extending position thereafter. A preferred adapter designed to maintain such a flange extending outwardly is disclosed herein together with the mold and method of producing the same, and the method of its production constitutes a part of the invention.

The invention will be further described in connection with the accompanying drawings, in which—

FIG. 1 shows two sections through an adapter in different bottles of the same outside diameter but different inside diameters;

FIG. 2 is a section on the line 2—2 of FIG. 1; and

FIGS. 3-A to 3-E show more or less diagrammatically a section through one part of a mold and ejector in different positions relative to the mold and an adapter in different stages of being ejected from the mold.

FIGURE 1 shows the same adapter 30 in the necks of two different bottles 31 and 32. The outside diameter of both necks is held to the same close minimum tolerance because the root diameter of the threads and their outer diameter must be substantially the same on all bottles of a given nominal size to prevent standard caps from jumping the threads. Therefore, the adapter 30 is designed to contact the end of the bottle in the same location near its outer edge so that regardless of whether the bottle has a thick or thin wall, the ring of the adapter making such contact will surely contact the end of the bottle.

The inside diameter of the neck 31 is much smaller than the inside diameter of the neck 32. Both necks are externally threaded at 34. The adapter is designed to make contact with the end of the bottle by means of the ring 36. This ring is located so as to contact the outer edge of a bottle to insure its making contact with the end of the neck of the bottle regardless of its inside diameter. Thus these adapters are designed to function properly when inserted in any bottle made to the standard specifications. The outer edge of the ring 36 is indented only slightly from the outer edge of the surface 37 at the top of the adapter. This surface 37 measures about .015 to .025 inch across. This gives body to the pouring lip so that in molding the plastic fills the mold at this location without voids, and in use, when a cap is screwed on to the bottle, the pouring lip is depressed without crazing or cracking or splitting or other damage.

The lower flange 38 is an annular flange which makes contact with the inner surface of the bottle neck at or near the bottom of the adapter. This flange is flexible and in a bottle having a neck of smaller inside diameter this flange 38 is flexed upwardly as illustrated in the upper of the two views shown in FIG. 1. The plastic is somewhat stiff and the lower of the two views shows that it is only necessary that this flange make more than bare contact with the inner surface of the neck in order to center the adapter within the neck and hold it there.

The stiff, flexible fins 38' (of which there usually need be no more than three or four) center the upper portion of the adapter in the bottle neck. Projections of other shapes may be utilized for the same purpose. The fins 38' extend from the outer wall of the adapter at an angle of about 20 degrees away from a true radius (see FIG. 2), and may be folded substantially flat against the adapter wall as shown in the upper view of FIG. 1, or may extend substantially straight with only their tips bent against the bottle neck, as in the lower view of FIG. 1 and in FIG. 2. FIGURES 1 and 2 show the extreme situations. Usually the inner diameter of the neck of a standard bottle will be of a size between the extremes shown.

The adapter design shown in FIGS. 1 and 2 is more or less schematic. When the adapter is made by injection molding and is removed from the mold by ejection upwardly, the wall of the adapter immediately above the annular bottom flange is advantageously provided with excess thickness so that on cooling, with accompanying shrinkage, there is a tendency for the annular flange to draw upwardly after removal from the mold, and then it will extend outwardly in a substantially horizontal position or it may be inclined slightly upwardly as is illustrated in the adapter 45 shown in FIG. 3-A, immediately after molding. The adapter is of the general type shown in FIGS. 1 and 2 and is provided with a thin upper lip 46. The pointed circular ring 47 is adapted to make sealing contact with the end of the bottle or other container. The flange 49 inclines somewhat upwardly as well as outwardly. This facilitates insertion of the adapter in a neck so narrow as to squeeze the flange and direct it in a more upwardly direction.

FIGURES 3-A to 3-E form a series. The mold 55 is shown only in part. It comprises a circular opening, and the indentations shown in the molding surface of the mold wall in FIG. 3-A continue around the cylindrical molding surface.

The adapter is molded by injection molding or the like. It may be of polyethylene or other stiff, flexible thermoplastic. For use in bottles containing alcoholic beverages or other materials which have a deleterious effect on the particular plastic employed, the plastic may be coated with a suitable lacquer.

As shown in FIGS. 3-A to 3-E, the mold 55 remains stationary. The ejector 56, the top surface of which is cylindrical, is moved upwardly in the mold cavity after completion of the molding operation and after the removal of the core and the cope of the mold which shapes the top portion of the adapter which lies above the top of the mold portion 55.

As the adapter is ejected from the mold cavity the flange 49 is bent downwardly as shown in the various views. It is forced downwardly on withdrawal from the annular depression 57 in the mold in which it was formed. In order to provide room for it in the mold when it is bent down on removal, the wall 58 below it is of less diameter than the wall above it. If the opening through the adapter is to be kept uniform, the combined thickness of the flange 49 and the wall 58 is no greater than the thickness of the wall above the flange 49. This provides room for the flange 49 to be bent down against the wall 48 without subjecting it to a permanent downward set as it is ejected from the mold.

Unless means is provided to protect the flange 49, as herein disclosed, when the adapter is removed from the mold cavity the flange 49 is bent sharply downward and stretched and is apt to be ruptured and to be given a permanent downward set. In order to prevent this and force the flange 49 upwardly and outwardly as the adapter is cooled, the wall of the adapter immediately above the flange 49 is thickened as by provision of the bead 59. As this bead cools it shrinks, and this automatically lifts the flange 49 to an outwardly extending position. The bead 59 may be replaced by a thickened portion of plastic of any size and shape.

FIGURES 3-A to 3-E show the adapter as it is progressively removed from the mold. The shape of the bead 59 is such that as the ejector pushes the adapter upwardly to remove it from the mold cavity the bead is easily retracted sufficiently to slide inwardly over the upper portion of the wall of the molding cavity. This is shown in the drawings. In the final stage of the ejection of the adapter the annular flange 49 is freed from the mold cavity and on cooling, the shrinkage of the bead 59 tends to lift the flange 49 to an outwardly extending position.

The drawings deal with only one type of adapter which is provided with a thin pouring lip. It is obvious that the invention is not limited to this type of adapter. It includes adapters of all sizes and shapes which are adapted to fit into a bottle neck. For example, it includes those of the general types shown in my Patents 2,715,480 and 2,743,844, but is not limited thereto.

The invention is covered in the claims which follow.

What I claim is:

1. A hollow plastic pouring adapter for use inside the neck of a container which adapter has a pouring opening through it, and extending from the outer wall thereof a thin, stiff, flexible flange in a plane at an angle to the axis of the adapter, the wall of the adapter immediately above said flange being at least as thick as the sum of the thicknesses of the flange and of the wall immediately below the flange.

2. A hollow plastic pouring adapter for use inside the neck of a container which adapter has a pouring opening through it, and extending from the outer wall thereof a thin, stiff, flexible flange which surrounds the adapter in a plane substantially perpendicular to the axis of the adapter, the wall of the adapter immediately above said flange being at least as thick as the sum of the thicknesses of the flange and of the wall immediately below the flange.

3. A hollow plastic pouring adapter for use inside the neck of a container which adapter has a pouring opening through it, and extending from the outer wall thereof a thin, stiff, flexible flange which surrounds the adapter in a plane substantially perpendicular to the axis of the adapter, the wall of the adapter immediately above said flange being at least as thick as the sum of the thicknesses of the flange and of the wall immediately below the flange, there being a bead on the outer wall of the adapter spaced a short distance above the flange whereby when the adapter cools immediately after manufacture from hot plastic, the bead shrinks and lifts the flange.

References Cited in the file of this patent

UNITED STATES PATENTS

| 2,526,225 | Gronemeyer et al. | Oct. 17, 1950 |
| 2,551,834 | Ferguson | May 8, 1951 |
| 2,834,497 | Wolf | May 13, 1958 |

FOREIGN PATENTS

| 1,093,979 | France | Dec. 1, 1954 |